Dec. 21, 1965   P. MOYAT   3,224,837
PROCESS AND DEVICE FOR THE DETERMINATION OF ORGANIC SUBSTANCES
CONTAINED IN WATER
Filed Dec. 17, 1962
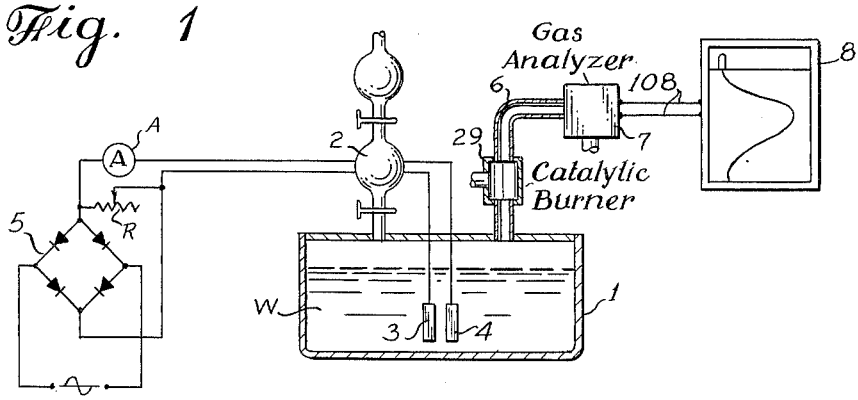
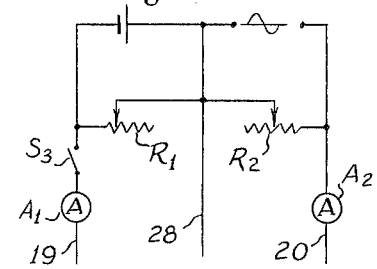
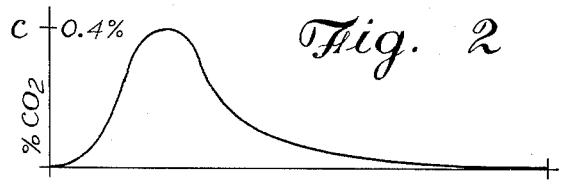
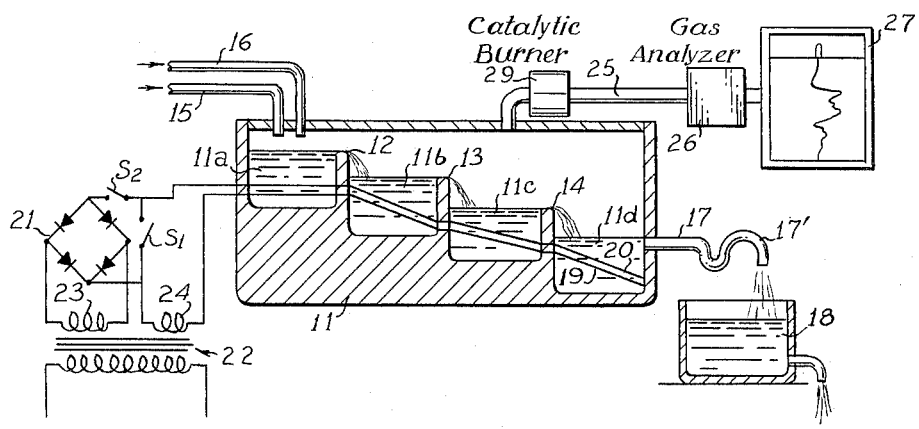

United States Patent Office 3,224,837
Patented Dec. 21, 1965

3,224,837
PROCESS AND DEVICE FOR THE DETERMINATION OF ORGANIC SUBSTANCES CONTAINED IN WATER
Peter Moyat, Bergen-Enkheim, Germany, assignor to Hartmann & Braun Aktiengesellschaft, Frankfurt am Main, Germany, a corporation of Germany
Filed Dec. 17, 1962, Ser. No. 245,280
Claims priority, application Germany, Dec. 22, 1961, H 44,462
10 Claims. (Cl. 23—230)

For the determination of organic substances obtained in water especially pollution, in waste water there has been the usual measure of the biological oxygen demand by a bacteria culture feeding on the polluting substances. This method is very troublesome and time consuming for several days are required in making the test for the bacteria to use up the pollutant.

Another method for determining the content of oxidizable organic substances in water, which also serves for the determination of organic pollution, involves the treatment of the water by a strong oxidizing agent and consumption of the oxidizing agent is determined by titration. This method is also troublesome and time consuming in addition to its requiring trained personnel.

The process of the present invention is quickly and easily carried out and avoids the disadvantages of the prior art.

The invention is especially suitable for checking or monitoring sewage and more particularly domestic sewage, i.e., sewage containing human waste, and has for an object the rapid determination of the oxygen demand. A special use of the invention as illustrated is the monitoring or checking of effluent from a sewage disposal installation so it may be known, within practical tolerances, whether the installation is being overloaded.

Another use closely related with that just mentioned is in the monitoring of sewerage destined for a given disposal plant so that it may be known whether acid fermentation is likely to occur and so warn proper authorities that plant is, or will become, inadequate for the current load.

Still another use is in the determination of organic substances in general when present in relatively small quantities in water and which may be electrolytically converted to gaseous substances.

An object of the invention is, therefore, to provide a fast acting apparatus for the checking of the oxygen demand of sewage and which can be used by essentially inexperienced operators and one which avoids the need for bacterial cultures or any titration operation.

Another object is to provide an apparatus and method which is adapted to continuous monitoring of sewage for oxygen demand.

These objects are attained in an apparatus, and related mode of operation, which briefly stated comprises a container for the polluted water under test and provided with electrodes. The water is treated with an acid electrolyte and current passed between the electrodes. Elemental or nascent oxygen at the anode combines with carbon of the organic substances and is elvolved as carbo ndioxide, the latter being measured as the indication of pollution with respect to the amount or flow of the water.

In the accompanying drawing showing, by way of example, two of many possible embodiments of the invention:

FIG. 1 is a diagrammatic representation of the invention for use with a single sample;

FIG. 2 is a typical standard curve showing the rate of evolution of carbon dioxide, against time, from a standard sugar solution;

FIG. 3 shows a form of the invention especially adapted to continuous operation; and FIG. 4 shows another electrode arrangement.

In the example according to FIG. 1 a gas-tight closed container 1 holds a previously measured amount of the water sample W. By means of a conventional dosing device 2, such as a volumetric funnel having upper and lower stop cocks and a top supply reservoir, a predetermined amount of acid is added to the sample. The acid with the water to be analyzed in the container form the electrolyte of an electrolysis cell having electrodes 3 and 4. The electrodes are preferably a noble metal or material which is not appreciably attacked during electrolysis. Flow of current to the electrodes may be controlled in a known manner as by a shunting variable resistor R and a D.C. ammeter A. The electrodes are connected to a source of alternating current through a full-wave rectifier 5. The rectifier need not be perfect, i.e., its output may be undulating current. By means of the electrolytic process the organic substances in the electrolyte are oxidized to carbon dioxide by oxygen produced at the anode. The carbon dioxide with the other products of electrolysis, mostly hydrogen and oxygen, are led out through the duct 6 to a gas analyzing device 7. The device 7 may be of known type operating on the principle of selective infra-red absorption; an analyzer depending on thermal diffusion measurement may be used also. An electrically operated registering instrument 8 is connected via leads 108 to the analyzer by which the carbon dioxide content of the gases produced by electrolysis are indicated and recorded on a steadily moving chart. If the rate of evolution of total gases is not substantially constant the total volume of evolved gases should be measured.

FIG. 2 shows the carbon dioxide concentration of the gaseous electrolysis products against time with organic substance polluting a given amount of water. The carbon dioxide concentration rises after the electrolysis current is switched on, reaches a maximum value and then falls off after resulting oxidation of a great part of the organic pollution substances. The area integral under the curve showing instantaneous values of the carbon dioxide concentration in the gaseous product of electrolysis indicates the entire amount of pollution of the test water.

FIG. 3 shows a device for the carrying out of a continuous determination and registration of existing degrees of waste water pollution by organic substances. The closed container 11 is divided by means of partition walls 12, 13 and 14 into a plurality of successively lower subsections 11a, 11b, 11c and 11d so that liquid may cascade from the higher subsections to one lower and over the partition wall between. The liquid to be analyzed enters through inlet tube 15 to supply the highest subsection and a proportion of acid enters the same subsection by means of the inlet tube 16. Thus the electrolyte flows from the highest subsection 11a over the partition wall 12 into subsection 11b and thence on over the walls 13 and 14 in like manner and finally from the overflow tube 17 in communication with the lowest subsection 11d. A trap 17' may be used in the overflow tube 17 to seal the container 11 against the escape of gas, but if the rates of inflow from feed tubes 15 and 16 are such relative to the size of the overflow tube 17 that a slight head builds up in subsection 11d, the trap may be omitted. Effluent from the container may be detained, if desired, in a catch basin 18.

Two noble metal wires 19 and 20 run through all the subsections and serve as electrodes. They are disposed through the respective partition walls so as to lie in the lower half portion of the fluid in the several subsections and are insulated from each other at their lower right ends as shown in the drawing at the wall of the container 11. The electrodes are connectible to the output of a rectifier 21 fed by a secondary 23 of a transformer 22. As shown, the connection may be through another secondary 24 of the transformer. The simultaneous feed to the electrodes with direct and alternating current has the result of reducing the amount of gaseous products of electrolysis. This produces an enrichment of the evolved gases with respect to carbon dioxide for a given amount of the latter.

The gases from the liquid in the container 11 are led through a tube 25 to a gas analyzer 26 having a registering recorder 27. The content of carbon dioxide in the gaseous products of electrolysis is a measure of the organic pollution of the water undergoing test, provided the throughput time in the container 11 is sufficient for the oxidation of the total amount of organic pollution. This can be easily accomplished by the control of the amount of input of electrolyte, the size of the container 11 and of the current density. The shown arrangement may be modified by the use of three electrodes 19, 20 and 28 as shown in FIG. 4 wherein the serial connection between the A.C. and D.C. sources is tapped for connection to electrode 28. The third electrode is disposed along with others through the walls 12, 13 and 14.

It is to be understood that the usual controls and switches necessary to enable the control of current and circuits may be provided such as switches $S_1$ and $S_2$ in FIG. 3 and variable resistors $R_1$ and $R_2$ as well as a D.C. ammeter $A_1$, A.C. ammeter $A_2$, in FIG. 4. The resistors and ammeters of FIG. 4 may be appropriately used in the circuit of FIG. 3.

In the operation of the invention as shown in FIG. 1 a measured volume sample of some several milliliters are placed in the container 1. Due to the nature of the test, a sample as small as 2 ml. is satisfactory when there is no danger of any occluded or absorbed $CO_2$ being present in the apparatus. A larger sample of 10 ml. is also satisfactory although this entails the need for greater current densities and/or prolonged electrolysis.

A mineral acid such as sulfuric acid is added to bring the acid concentration up to about 2 normal in the reaction medium, and current at from 2 to 4 volts is applied to the electrodes and the electrolysis carried out at about 50° C. under constant voltage or constant current. The gaseous products of electrolysis are analyzed for instantaneous $CO_2$ content and total volume of gas during a run. The $CO_2$ content usually does not begin to show up immediately, probably due to initial oxidation of the polluting materials to complex unsaturated substances soluble in the aqueous medium. Then the $CO_2$ content begins to rise rather rapidly, usually within about 5 or 10 minutes, and reaches a maximum value. The $CO_2$ content then approaches zero at a much slower rate than its increase.

A specific curve for $CO_2$ content against time at a substantially constant rate of electrolysis of a sugar solution to produce carrier gases of hydrogen and unreacted oxygen is shown in FIG. 2.

Current values are usually chosen so as to enable the reaching of a zero carbon dioxide content within an hour and for faster operation and more readily converted substances oxalic acid for instance the reaction is complete in as little as 20 minutes. The current is always so high that the major gaseous products are hydrogen and oxygen with the $CO_2$ content hardly ever about 1%. Total gas evolution at the rate of about 20 cc. per hour per ml. of sample is satisfactory, but rates can be varied widely, say down to about 5 cc. of total gas. The upper limit is governed largely by the sensitivity of the carbon dioxide analyzer.

The curve of FIG. 2 was obtained from a 20 mg./liter of cane sugar solution and the electrolysis terminated after 50 minutes of electrolysis. The maximum concentration of $CO_2$ indicated was 0.4%. The area integral under the curve multiplied by total volume of evolved gases, the volume of $CO_2$ produced, corresponded to 96% of the theoretical amount of carbon dioxide producible by the oxidation of carbon in the sugar. The 20 mg./l. solution is to be considered a standard comparable with human waste with an average content of 5 to 30 mg./l. of organic content.

Thus the area under a curve such as in FIG. 2 can indicate relative amounts of pollution compared with a standard sucrose curve. If duration time and current densities and sample size are the same, the peak value may be all that is necessary, although the profile of the curve may sometimes be of consequence. This is especially true when the pollutants have high molecular weights and their diffusion is slow.

While the method of analysis is a carbon dioxide method, the results obtained are generally better than those from 5 standard B.O.D. methods for it is applicable to substances which cannot be decomposed biologically as well. However the latter in most cases are of minor importance with respect to quantity. On the other hand by filtering out non-dissolved granular substances before testing the water such substances would not of course enter into the measurement. In many cases this filtering leads to a mutual balancing out of errors if a mere B.O.D. test is desired.

In the operation of the invention according to FIG. 3 the basic principle is much the same as that of FIG. 1 except for continuous duty and if its water and acid feed are held constant at constant current density there is often no need for measuring the total volume of gas evolved. Acidity of the electrolyte is about 2 N.

Detention time in the cells is satisfactory at about 10 minutes though it may be varied, the D.C. component of the current may be from about 0.2 to 0.5 amp and the A.C. component from 1 to 5 amps. When electrodes 20 and 28 are used the current of the A.C. electrodes at 50 c.p.s. is so regulated that there is hardly any noticeable generation of gas by the A.C. only and then the D.C. electrodes are energized. A ratio of 10:1 for the A.C. to D.C. usually gives good proportions of $CO_2$ to the evolved carrier gases.

The carbon dioxide content in the conduit 25 is contemplated to vary between 0.05 and 1.0 percent according to the type of water treated.

In order that the readings on recorder 27 indicate total possible oxidation it is suggested that a batch sample be run under conditions as shown in FIGS. 1 and 2 to determine normal rate of oxidation for detention, current density and the like.

The current densities are not to be considered highly critical. Excessive current tends to liberate oxygen (and hydrogen) faster than the organic substances can diffuse to the electrode surfaces and so reduce the proportion of carbon dioxide in the carrier gases. If the current is quickly lowered or reversed, the oxygen and hydrogen at their respective electrodes, which has not reacted with carbon is either re-ionized or held absorbed on the electrode. The carbon to oxygen bond is quite strong so that there is very little tendency for carbon dioxide to be decomposed by hydrogen. Thus simultaneous use of A.C. on D.C. in effect gives high momentary amounts of active oxygen at the cathode for substantially irreversible oxidation of carbon. The biasing D.C. component tends to prevent any reduction of $CO_2$ if the A.C. is too large.

In the operation of the two electrode system of FIG. 3, the A.C. output from secondary 24 can also be adjusted to give a faint evolution of gas at 50 c.p.s. and then the D.C. is switched on.

The formation of other volatile compounds of carbon, such as, say, hydrocarbons at the cathode, does not generally present any problem, but if so, a catalytic oxidizer 29 having its oxygen supply independent of that from the cell may be provided ahead of the gas analyzer. In such cases an additional carrier gas is of course desirable.

The invention is most particularly suitable for the determination of water and acid soluble organic substances in relatively small amounts. However, by increasing the time between the addition of the acid and the electrolysis to permit hydrolysis of say cellulosic material the invention is applicable to the analysis of say textile and paper pulp mill pollution.

The invention claimed is:

1. A process for determination of the content of organic substances in water by oxidation, said process comprising electrolyzing the water containing the substance to produce a mixture of hydrogen, oxygen and carbon dioxide and determining the carbon dioxide content of the mixture as a measure of organic substances in the water.

2. A process for determining the content of organic substances in water comprising acidulating the water to form an electrolyte, electrolyzing the electrolyte to evolve a mixture of hydrogen, oxygen and carbon dioxide at substantially constant current, conducting said mixture past a given point, determining the instantaneous carbon dioxide percentages of the mixture at said point during the electrolysis until the carbon dioxide content becomes substantially zero, recording the instantaneous carbon dioxide percentages on a chart moving at constant speed to give a curve so that the shape of the curve and the area thereunder can be interpreted with respect to standards.

3. A process for the determination of organic substances in a relatively large volume of water comprising acidulating the water to produce an electrolyte; electrolyzing the electrolyte to produce an approximately constant rate of evolution of a mixture of hydrogen, oxygen and carbon dioxide and sensing the substantially instantaneous carbon dioxide content of the evolving gases while the evolution of total gases is at an approximately constant rate.

4. A process as claimed in claim 3, said electrolysis being of a single batch of sample, and recording the carbon dioxide content on a chart moving at constant rate, and continuing the electrolysis until the carbon dioxide content is substantially zero to produce a graph having and area bounded by the curve related to the content of the said substances.

5. A process as claimed in claim 3, the electrolysis being of a constant rate stream of the acidulated water through a series of cells and moving at a slow enough rate so that further detention would substantially be without effect on the substances.

6. An apparatus for the determination of organic substances in relatively large amounts of water comprising a substantially closed vessel adapted to contain the water; means for adding a treating fluid to the water; electrodes in the vessel to form an electrolytic cell with the treated water as electrolyte; means for supplying current in a predetermined manner to the electrodes; a gas analyzer for determining the instantaneous carbon dioxide content of gases, and a conduit connecting the analyzer to the vessel, and a recorder for recording the reading of the analyzer as a carbon-dioxide content against time diagram.

7. An apparatus as claimed in claim 6, said recorder having a chart moving at constant rate so that when the rate of evolution of gases is constant the area of the diagram will be substantially indicative of the total amount of substances oxidized in the cell to carbon dioxide.

8. An apparatus as claimed in claim 6, said vessel having a plurality of adjacent compartments each at a higher level than the next and the highest provided with an inlet means for the water and the lowest with an outlet means whereby water from the highest will cascade from higher to lower compartments during a through-put of the water to tend to liberate gases from the water, the electrodes being on contact with the water in each compartment.

9. In a process for the determination of water pollution by carbonaceous organic substances wherein such substances are oxidized to carbon dioxide and the carbon dioxide content of carbon gases determined, the steps of acidulating the water; disposing the acidulated water in an electrolytic cell for electrolytic oxidation, applying a sufficiently large alternating current of the order of 50 cycles per second at electrolyzing voltage so that there is a faint evolution of gas, and then superimposing a direct electrolyzing current of lesser magnitude on the alternating current to substantially liberate a mixture of hydrogen, oxygen, and carbon dioxide for analysis of the latter.

10. In the operation of a device for the electrolytic oxidation to carbon dioxide of organic pollutants in water in which there are three electrodes, applying an alternating current of the order of 50 cycles per second just sufficient to liberate gas to two of the electrodes and maintaining said current substantially constant and applying direct current of lesser magnitude between one of said two and the third electrode.

References Cited by the Examiner

Analytical Chemistry, vol. 32, No. 2, February 1960, pp. 274–277.

Analytical Chemistry, vol. 35, No. 3, March 1963, pp. 315–319.

Analytical Chemistry, vol. 35, No. 6, May 1963, pp. 660–663.

Sewage, Industrial Wastes, vol. 24, No. 9, September 1952, pp. 1091–1097.

MORRIS O. WOLK, *Primary Examiner.*